United States Patent [19]

Noble et al.

[11] Patent Number: 4,672,533

[45] Date of Patent: Jun. 9, 1987

[54] ELECTRONIC LINKAGE INTERFACE CONTROL SECURITY SYSTEM AND METHOD

[76] Inventors: Richard G. Noble, 7846 Airlane Ave., Westchester, Calif. 90045; Garland L. Cole, 7548 McGroarty Ter., Tujunga, Calif. 91042; Irwin H. Usher, 3989 Le Cont Ct., Simi Valley, Calif. 93063

[21] Appl. No.: 683,917

[22] Filed: Dec. 19, 1984

[51] Int. Cl.[4] .......................... G06F 12/14; H04L 9/00
[52] U.S. Cl. ............................. 364/200; 340/825.34; 379/95; 380/25
[58] Field of Search ............. 178/22.08, 22.09; 340/825.34; 375/2.1; 364/200 MS File, 900 MS File

[56] References Cited

U.S. PATENT DOCUMENTS

| | | | |
|---|---|---|---|
| 3,798,605 | 3/1974 | Feistel | 364/200 |
| 4,193,131 | 3/1980 | Lennon et al. | 178/22.08 |
| 4,196,310 | 4/1980 | Forman et al. | 375/2.1 |
| 4,281,216 | 7/1981 | Hogg et al. | 178/22.08 |
| 4,310,720 | 1/1982 | Check, Jr. | 178/22.08 |
| 4,315,101 | 2/1982 | Atalla | 178/22.08 |
| 4,349,695 | 9/1982 | Morgan et al. | 178/22.08 |
| 4,369,332 | 1/1983 | Campbell | 178/22.07 |
| 4,458,109 | 7/1984 | Mueller-Schloer | 178/22.11 |
| 4,484,306 | 11/1984 | Kulczyckyj et al. | 364/900 |
| 4,503,287 | 3/1985 | Morris et al. | 178/22.08 |
| 4,536,647 | 8/1985 | Atalla et al. | 235/379 |
| 4,578,530 | 3/1986 | Zeidler | 178/22.09 |
| 4,578,531 | 3/1986 | Everhart et al. | 178/22.08 |
| 4,590,470 | 5/1986 | Koenig | 340/825.31 |

Primary Examiner—Archie E. Williams
Assistant Examiner—Florin Munteanu
Attorney, Agent, or Firm—Albert O. Cota

[57] ABSTRACT

An electronic computer linkage interface control security system that allows a remote computer terminal to control the across to a main computer. The system includes a Computer Linkage Interface Control (CLIC) module that is coupled to the terminal and that generates and stores a random or pseudo-random coupling code that is unique to the terminal and unique for each communication session. The computer, in which the coupling code for the current communications session was stored during the previous session, accesses the current coupling code store in the CLIC module for comparison with the computer's previously stored code. If a match occurs, access by the terminal to the main computer is permitted.

1 Claim, 3 Drawing Figures

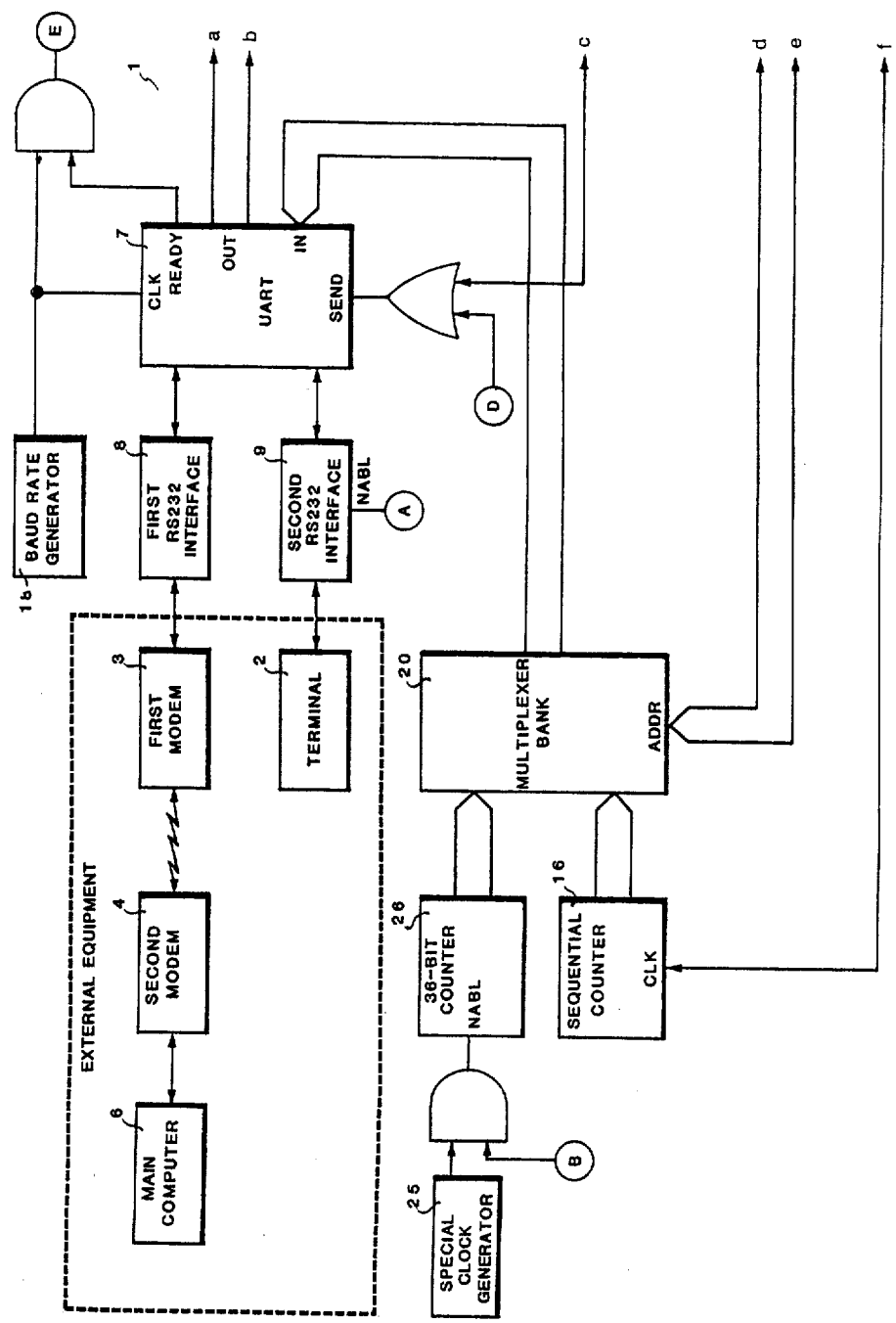
FIG. 2 (PART A)

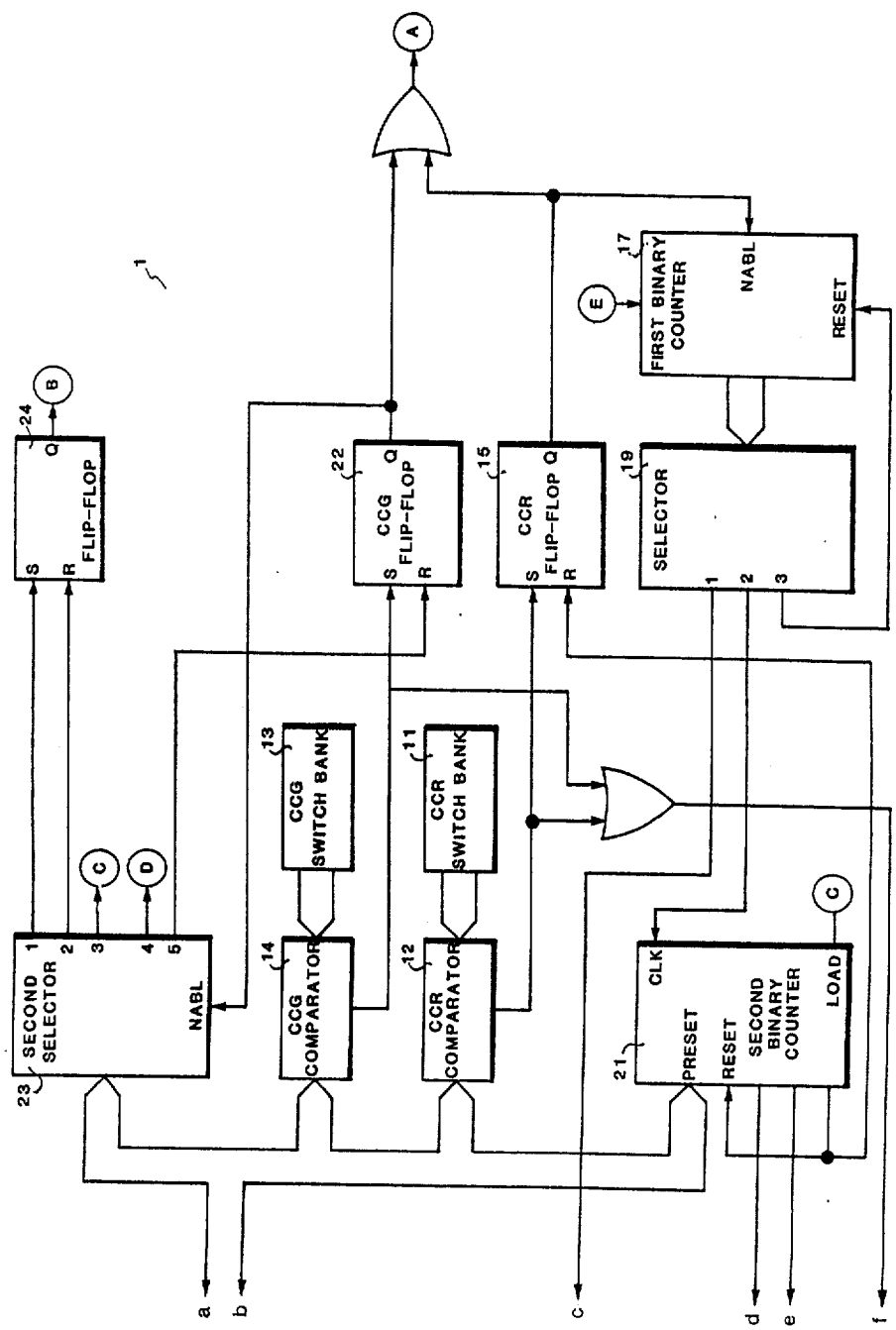
FIG. 2(PART B)

ELECTRONIC LINKAGE INTERFACE CONTROL SECURITY SYSTEM AND METHOD

BACKGROUND OF THE INVENTION

1. Field of the Invention

This invention relates to electronic communication linkage security systems, and more particularly to an improved electronic computer linkage interface control security system and method for providing secure communications access between digital data devices.

2. Related Art

As computer usage increases, and particularly as the scope of computer communication network system usage increases, a greater number of computer users potentially have access to any one computer system. Hence, the need exists for increased security for such computer systems by limiting computer access to only authorized users. One manner of controlling such access is to permit only authorized terminals to be used in accessing a main computer. While a variety of computer access control systems have been proposed in the past, most such systems rely solely on presentation of a computer terminal password or identification number to a main computer system for comparison with stored data records so as to verify the authorization of that terminal to access the computer. Such simple password or identification schemes are subject to failure if a determined effort is made to evade or corrupt the security system. For example, a determined unauthorized user may actually be able to intercept an authorized terminal's password or identification number during a communication session between an authorized user on an authorized terminal and a main computer. Thereafter, the unauthorized user may be able to surreptitiously obtain access to the main computer using the intercepted password or identification number to emulate an authorized terminal.

Therefore, it is an object of this invention to provide a low cost digital data communications linkage interface control system and method for more reliably controlling access from a computer terminal to a main computer over a communications linkage and to minimize or eliminate the possibility of using an intercepted copy of the terminal's password or identification number. The present invention achieves this object by means of a simple electronic circuit combined with a method implemented by means of a computer program for regulating such access to authorized terminals only.

SUMMARY OF THE INVENTION

The present invention provides a low cost digital data communications linkage interface control system for regulating access between digital data devices, and in particular for regulating access from a computer terminal to a main computer. (For purposes of this description, the example of a computer terminal and main computer will be used throughout). Each terminal is coupled through a computer linkage interface control (CLIC) module that generates and stores a random or pseudo-random identification number, or coupling code, that is unique to the terminal. In operation, when a user desires to communicate from the terminal to the main computer, a sign-on code is transmitted from the terminal to the main computer. This sign-on code may be in accordance with commonly known sign-on procedures. A computer program in the main computer (or alternately in a pre-processor computer controlling communications access to the main computer), or a hardware device in the main computer, or a combination of both, receives the sign-on code, searches for that sign-on code in electronic storage or memory, and retrieves a coupling code associated with that sign-on code. The main computer or pre-processor then communicates with the CLIC module associated with the terminal, and requests that the coupling code stored in the CLIC module be sent back for comparison with the retrieved coupling code. If a match occurs, access by the terminal to the main computer is granted. Otherwise, no communication is permitted between the terminal and the main computer. In addition, the main computer or pre-processor may create a log of access attempts, which may contain information including the terminal identification number, the date and time of access, and other desirable information.

After access by the terminal to the main computer is granted, the main computer or the pre-processor sends at least one message to the CLIC module to cause generation of a new random or pseudo-random coupling code. Prior to termination of the communications session, at least one new coupling code is sent to the main computer or pre-processor and stored in memory.

This invention is thus designed to permit only terminals having a proper coupling code to be connected to the main computer.

The novel features which are believed to be characteristic of the invention, both as to its organization and method of operation, together with further objectives and advantages thereof, will be better understood from the following description considered in conjunction with the accompanying drawings in which the presently preferred embodiment of the invention is illustrated by way of example. It is to be expressly understood, however, that the drawings are for the purpose of illustration and description only, and are not intended as a definition of the limitations of the invention.

DESCRIPTION OF THE DRAWINGS

The invention will become better understood by reference to the following detailed description when taken in conjunction with the accompanying drawings showing the preferred embodiment of the invention.

Like reference numbers in the figures refer to like elements.

DESCRIPTION OF THE PREFERRED EMBODIMENT

Figure 1:
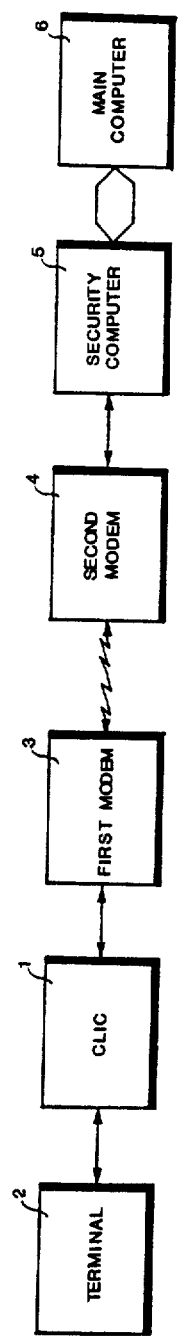
FIG. 1 is a schematic diagram of the general component parts of the inventive communications linkage interface control system., FIG. 2 (PART A and PART B) is a schematic diagram of the inventive computer linkage interface control module.

FIG. 1 shows a general schematic of the inventive CLIC module 1 in a typical configuration. A terminal 2, which may be a video terminal, printer terminal, personal computer, or other interactive computer communications device, is coupled through the CLIC module 1 to a first modulator/demodulator (modem) 3 which permits a telecommunications linkage to a second modem 4. The second modem 4 in turn connects to a security computer 5 in the preferred embodiment. The security computer 5 may be, for example, a personal computer, microcomputer, or minicomputer. The security computer 5 is in turn connected to a main computer 6. In an alternative embodiment, the functions of the security computer 5 can be implemented through similar computer programming in the main computer 6.

The modems 3, 4 are standard data communications devices and simply provide telecommunications access between the terminal 2 and CLIC module 1 and the security computer 5 and main computer 6, in known fashion. In the event a local area network or similar data communications system is used to connect the CLIC module 1 to the security computer 5, no modems are necessary, but other communication interfaces or devices may be substituted therefor in a fashion well-known in the art.

The purpose of the CLIC module 1 is to control access by the terminal 2 to the main computer 6. Part of the means for controlling such access may reside in the security computer 5, implemented in the preferred embodiment by means of a computer program. (In the following description, and particularly with respect to FIG. 2, reference will be made only to the main computer 6 as the means for performing the security program functions of the security computer 5). The CLIC module 1 and the security program act in essence as a gateway or switch controlling access by the terminal 2 to the main computer 6.

FIG. 2 is a schematic diagram of the CLIC module 1. Basically, a CLIC module is designed to be able to generate, store, and transmit upon command a random or pseudo-random number which is the coupling code for the terminal associated with the particular CLIC module. In the preferred embodiment, the coupling code comprises eight bytes. Of course, longer or shorter coupling codes can be implemented by simple variations of the circuitry shown in FIG. 2.

The CLIC module 1 shown in FIG. 2 selectively operates in one of two modes. The first mode, known as the Auto Send mode, is the mode used when a user first attempts access from the associated terminal 2 to the main computer 6 via the modem links 3, 4. In operation, the user is initially permitted access from the terminal 2 to the computer 6 solely for sign-on purposes. For example, the user's terminal may automatically send a terminal identification number through the CLIC module 1 to the computer 6. The computer 6 is programmed to search for this terminal identification number in a table having associated secret coupling codes stored in the computer or associated storage devices. Upon retrieving the associated coupling code, the programmed computer 6 generates a special control code which is sent to the CLIC module 1. This control code is detected by the CLIC module 1, causing its stored coupling code to be sent to the computer 6 for comparison with the coupling code previously retrieved by the computer 6. If a match occurs, the computer 6 permits access by the terminal 2 to the computer 6.

The CLIC module 1 has a second mode, known as the Control mode. Prior to termination of a communications session via the terminal 2 with the computer 6, a program in the computer 6 causes a second control code to be sent to the CLIC module 1 which activates the Control mode. In this mode, further commands from the computer 6 cause the CLIC module 1 to begin generating an increment command consisting of a new, random or pseudo-random coupling code. The new coupling code, once stored in the CLIC module, may thereafter be sent to the computer 6 for storage in replacement of the prior coupling code used for that terminal. In a subsequent communications session, this newly generated coupling code is used for controlling access by the terminal 2 to the computer 6.

Figure 3:
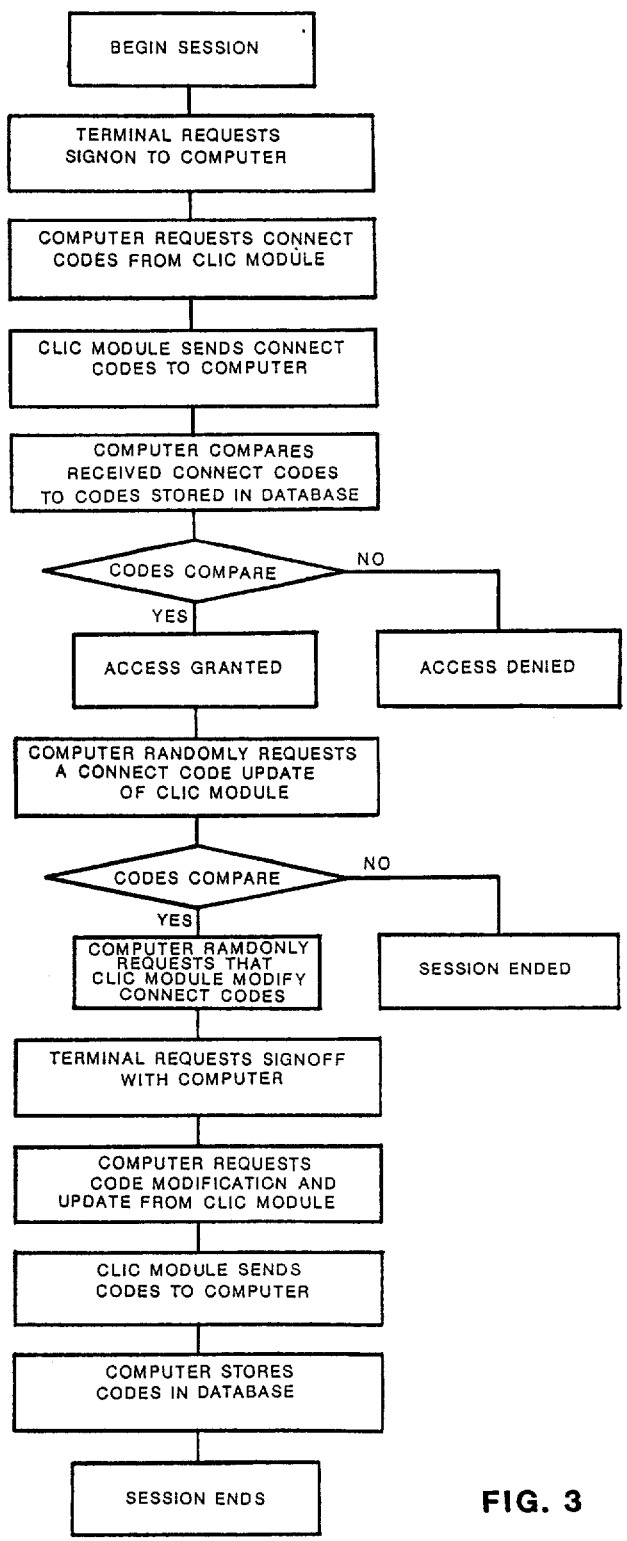
FIG. 3 is a flowchart depicting a typical communication session as disclosed by the invention.

A typical communication session from a terminal to a computer is shown in a flowchart included as FIG. 3.

Communications to and from the computer 6 and terminal 2 through the CLIC module 1 are primarily controlled by a dual universal asynchronous receiver/transmitter (UART) 7 and a first RS232 interface 8 and a second RS232 interface 9. These components are standard, and are well known in the art. During permitted communications between the terminal 2 and the computer 6, data flows bi-directionally through the first RS232 interface 8, the UART 7, and the second RS232 interface 9. The UART 7 is also configured to accept a serial bit stream from the computer 6 via the modems 3, 4 and output at least eight parallel bits of information on a bus 10. The CLIC module 1 constantly monitors the bit patterns transmitted from the computer 6 for the presence of one of two initial control codes. A CCR switch bank 11 is coupled to a CCR comparator 12, which in turn is coupled to the UART output bus 10. The CCR switch bank 11 simply permits setting a code (hexidecimal "FC" in the present embodiment) for input to the CCR comparator 12. Similarly, a CCG switch bank 13 inputs a code (hexadecimal "FD" in the present embodiment) to a CCG comparator 14, which is also coupled to the UART output bus 10.

After the initial terminal identification is sent to the computer 6, the computer 6 sends a coupling code request ("CCR") control code "FC" to the CLIC module 1. The CCR control code is detected by the CCR comparator 12, which generates an output signal that sets a CCR flip-flop 15, and also increments a sequential counter 16. The output of the CCR flip-flop 15 causes the RS232 interface circuit 9 coupled to the terminal 2 to be disabled, thus temporarily suspending communications between the terminal 2 and the computer 6. The output of the CCR flip-flop 15 also enables a first binary counter 17. The clock signal to the first binary counter 17 is generated by a baud rate generator 18, and is further controlled by a "ready" signal from the UART 7, generated in known fashion.

The output of the first binary counter 17 is coupled to a binary-to-decimal converter, or selector, 19. The selector 19 causes each binary count from the first binary counter 17 to activate a single corresponding output line.

Activation of the number 1 output line of the selector 19 causes a "send" signal to be sent to the UART 7. This "send" signal causes the output of a multiplexer bank 20 to be sent through the UART 7 to the computer 6. The multiplexer bank 20 in the preferred embodiment is a set of seven 8-to-1 multiplexers. Upon the occurrence of the first "send" signal, seven bits are sent from the multiplexer bank 20 through the UART 7 (which may add a parity bit if necessary) and sent on to the computer 6, where it is temporarily stored.

As the first binary counter 17 is clocked to its next output state, the second output of the selector 19 is activated, which causes a second binary counter 21 to be incremented. The second binary counter 21 in the Auto Send mode simply counts from binary zero through binary eight. The outputs from binary zero through binary seven are sent from the second binary counter 21 to the multiplexer bank 20 as address inputs. Thus, each count causes a new pattern of seven bits to appear on the outputs of the multiplexer bank 20. The second binary counter 21 eventually resets itself to binary zero upon the occurrence of a binary eight count, and further resets the CCR flip-flop 15.

The third output of the selector 19 simply causes the first binary counter 17 to be reset to binary zero, thus starting its counting cycle over, and sending the new output of the multiplexer bank 20 to the UART 7 for transmission to the computer 6.

The effect of the Auto Send mode is to cause the second binary counter 21 to address in sequence eight separate input patterns to the multiplexer bank 20. These eight seven-bit patterns are sent through the UART 7 to the computer 6, and comprise the coupling code for the CLIC module 1. If the coupling code sent by the CLIC module 1 to the computer 6 matches the coupling code previously stored in the computer 6 in a prior communication session, and that coupling code is the proper one associated with the terminal identification number sent at the commencement of the current session from the terminal 2 to the computer 6, then access by the terminal 2 to the computer 6 is permitted by the computer 6 itself.

At any time prior to the termination of the communications session between the terminal 2 and the computer 6, the computer 6 sends a second control code, the coupling code generation ("CCG") signal (which in the present embodiment is the hexadecimal number "FD") to the CLIC module 1. The CCG comparator 14 continuously monitors the UART output bus 10 and compares the signals on that bus to the settings of the CCG switchbank 13. When a match occurs, a CCG flip-flop 22 is set, and in addition the sequential counter 16 is incremented by one count. The setting of the CCG flip-flop 22 also causes the RS232 interface 9 between the CLIC module 1 and the terminal 2 to be temporarily disabled. The setting of the CCG flip-flop 22 also causes a second binary-to-decimal selector circuit 23 to be enabled for interpretation of the following commands:

Load Command
Start increment command
Stop increment command
Send command
Clear command In the preferred embodiment, four of the eight output lines from the UART bus 10 are decoded by the selector 23. Thus, the computer 6, after sending the CCG control command to the CLIC module 1, can send further control codes to the selector 23 which will selectively activate in the preferred embodiment one of five control lines.

Two of the control lines are used to set or reset, respectively, a flip-flop 24 which, in conjunction with a special clock generator 25, causes a counter 26 to generate a 36-bit number. The special clock generator 25 is preferably a somewhat inaccurate clock, to maximize the probability that the number generated by the 36-bit counter 26 will be essentially random, since the length of time that the counter 26 is permitted to count is intentionally arbitrary. The special clock generator 25 may simply consist of a common NE555 timer circuit. The output of the 36-bit counter 26 is randomly coupled into the multiplexer bank 20. That is, the thirty-six bit lines of the counter 26 are variously and randomly wired to one or more of the input lines of the seven 8-to-1 multiplexers comprising the multiplexer bank 20. This random connection causes a pseudo-random number to be generated when the multiplexer bank 20 is read out sequentially under control of the second binary counter 21. In addition, the output of the sequential counter 16 is also coupled into the multiplexer bank, but in a more orderly fashion. The sequential counter 16 has at least seven binary outputs in the preferred embodiment, each of which is coupled to a single one of the seven 8-to-1 multiplexers comprising the multiplexer bank 20. This allows the computer 6 to poll the CLIC module 1 at any time during a communications session using the CCG or CCR control codes and automatically cause the multiplexer bank 20 to generate a new coupling code simply from the incrementing of the sequential counter 16.

The remaining control lines from the selector 23 in the preferred embodiment include a preset load command, permitting an initial count (obtained from three lines of the UART output bus 10) to be loaded into the second binary counter 21, such that the second binary counter 21 will commence counting at the preset value. In addition, the selector 23 can decode a command from the computer 6 to cause a "send" signal to be generated to activate the UART 7 such that the multiplexer bank 20 may be accessed and read out by the computer 6 under direct control. Lastly, the selector 23 may decode a command from the computer 6 to reset the CCG flip-flop 22 to place the CLIC module 1 back into the Auto Send mode to await receipt of a CCR control command.

The ability to preset the binary counter 21 to any initial count value permits the computer 6 to access the coupling code formed by the multiplexer bank 20 in any order of bytes, as an added means for foiling an attempt to intercept and use a coupling code from an authorized terminal.

Before the communications session terminates, the computer 6 causes the newly generated coupling code to be sent from the CLIC module 1 to the computer 6 for storage. Thus, at a next communications session, this new coupling code is used for determining whether a terminal is authorized to access the main computer 6.

To summarize the method used in conjunction with the CLIC module 1, the following steps are taken:
1. A terminal identification number is sent from a terminal to a security program residing in the main computer or a pre-processor computer;
2. The security program polls the CLIC module of the terminal for the CLIC module's current coupling code and also retrieves from storage or memory the previously stored coupling code associated with the terminal identification number;
3. The security program compares the retrieved coupling code to the one received from the CLIC module;
4. If a match occurs, access from the terminal to the main computer is allowed; if not, access is denied;
5. Before the end of the communications session, the security program directs the CLIC module to generate at least one new coupling code and transmit it to the computer to store for use in a next communications session.

While this invention has been described with reference to a preferred embodiment, it is not intended that this description be construed in a limiting sense. For example, although particular circuits have been selected for use in the preferred embodiment, other components having similar characteristics could be used in the circuit. For example, the entire circuit or its functional equivalent may be implemented as a single integrated circuit. Various modifications of the preferred embodiment will be apparent to persons skilled in the art upon reference to this description. Thus, this invention is not to be limited to the specific embodiment discussed and illustrated herein, but rather by the following claim.

What is claimed is:

1. A communication linkage interface control circuit, coupled to a data terminal and a computer comprising:
   (a) a data transceiver having a receive mode and a transmit mode, for receiving data from and transmitting data to, the computer and the terminal;
   (b) a code monitoring circuit, coupled to the transceiver, for monitoring the data flow therein for the occurrence of command codes from the computer matching a set of preset codes;
   (c) first latch means coupled to the code monitoring circuit for temporarily indicating the occurrence of a first command code from the computer;
   (d) second latch means coupled to the code monitoring means for temporarily indicating the occurrence of a second command code from the computer;
   (e) a clock means, coupled to the transceiver, for generating a binary count in response to an increment command, or a preset command and a load command from the computer;
   (f) a first controller means, coupled to the first latch means, the transceiver, and the clock means, for alternately enabling the transmit mode of the transceiver means and supplying an increment command to the clock means upon the setting of the first latch means;
   (g) second controller means, coupled to the second latch means, the clock means, and the transceiver, for decoding and indicating at least a code generation command, or a load command, and a transmit command from the computer upon the setting of the second latch means; and
   (h) code generation and storage means, coupled to the clock means, the second controller means, and the transceiver, for generating and storing a random coupling code upon receipt of a decoded code generation command from the second controller means and sequentially transferring to the transceiver a portion of said random coupling code in response to each preset command, load command, and transmit command decoded by the second controller means from the computer, and for sequentially transferring to the transceiver a portion of the stored coupling code in response to each binary count received from the clock means.

* * * * *